O. H. BURDICK & O. F. DAGGETT.
Improvement in Mowing Machines.
No. 125,264. Patented April 2, 1872.
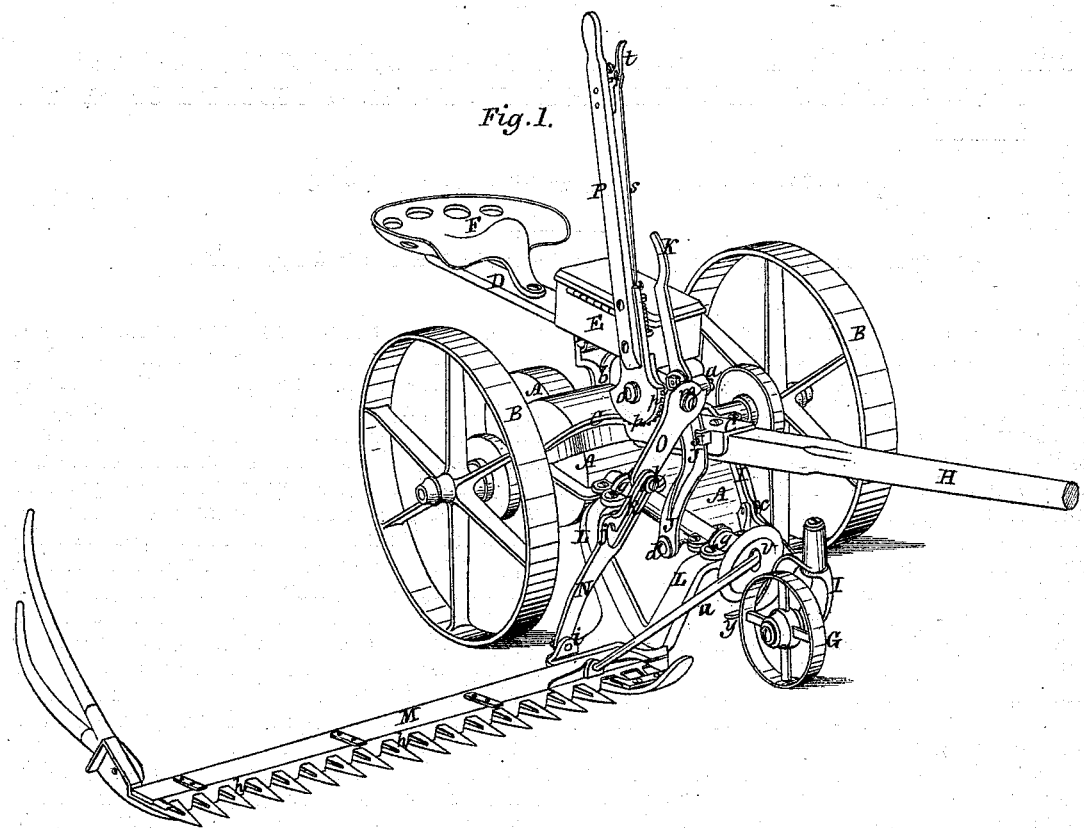
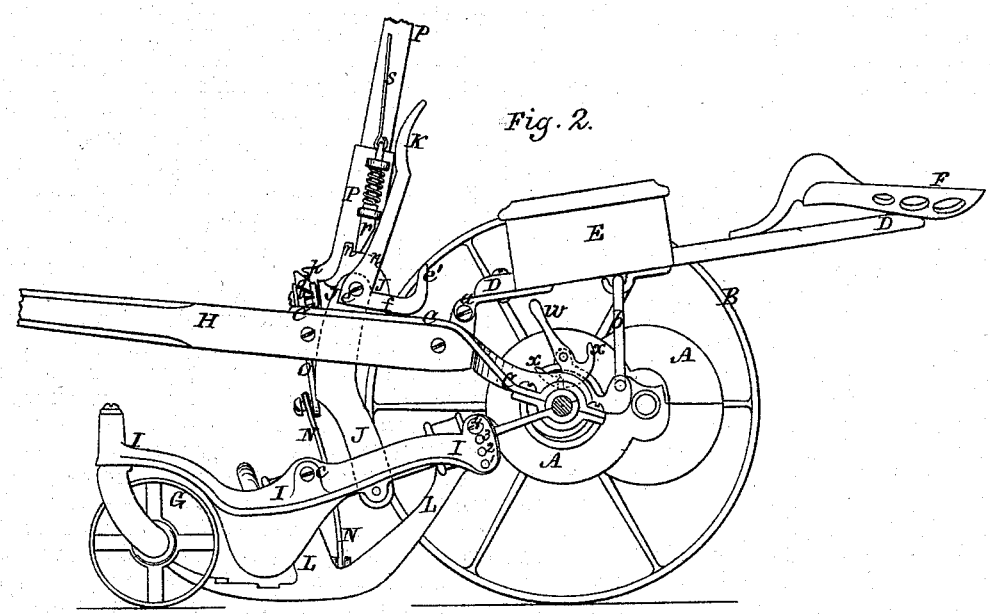

125,264

UNITED STATES PATENT OFFICE.

ORRIN H. BURDICK AND OSCAR F. DAGGETT, OF AUBURN, NEW YORK, ASSIGNORS TO ORRIN H. BURDICK AND DAVID M. OSBORNE, OF SAME PLACE.

IMPROVEMENT IN MOWING-MACHINES.

Specification forming part of Letters Patent No. 125,264, dated April 2, 1872.

*To all whom it may concern:*

Be it known that we, ORRIN H. BURDICK and OSCAR F. DAGGETT, of Auburn, in the county of Cayuga and State of New York, have invented certain new and useful Improvements in Mowing-Machines; and we do hereby declare the following to be a full, clear, and exact description of the same, reference being had to the accompanying drawing making a part of this specification, in which—

Figure 1 represents a perspective view of the machine complete. Fig. 2 represents a sectional elevation of the machine taken from the stubble side thereof.

Similar letters of reference where they occur in the separate figures denote like parts of the machine in the drawing.

This invention relates mainly to the construction and combination of devices by which the main frame and cutting apparatus are raised, lowered, or held in such positions as the exigencies of the case may require.

The main frame A, as herein shown and described, is of the kind known as a case-frame, inasmuch as it contains incased the driving-gear of the machine. This main frame is hinged to or on the main axle, said axle being supported in driving and carrying wheels B, and with a fast and loose mechanism for making them turn with or independently of the axle in the usual well-known way. The tongue-plate C is also hinged on or to the main axle, and through it as well as the main frame are so hinged as to have motions entirely independent of each other, yet they are so controlled by certain mechanism upon one that is, in turn, controlled or influenced by mechanism upon the other, as will be hereinafter more particularly described and referred to, as to make their movements harmonious or concerted. To the tongue-plate C is pivoted, as at *a*, a bar, D, upon the front part of which there is a tool-box, E, and upon the rear portion of which is placed the driver's seat F, said bar and seat being braced to the main frame, back of the main axle, by a pivoted or hinged brace, *b*. The caster-wheel G, which is in advance of the main frame and on the cutting side of the central line of draft or pole H, is supported and carried in a metallic bar or piece, I, which is united to the main frame by a yielding connection at *c*, and at its rear end it is furnished with a series of holes, 1, 2, 3, &c., by means of which and a pin or bolt, 4, the forward end of the main frame may be raised or lowered. To the main frame, at *d*, there is pivoted an arm, J, which extends upward in close proximity to the tongue-plate C, and far enough above the tongue to receive, hold, and control certain mechanism for raising, lowering, and holding the main frame and the cutting apparatus. On the tongue-plate are ears, 5, which catch over the edges or flanges of the arm J and keep it in proper position. On or to the top of the arm J, and on that side of it next the tongue, there is pivoted, as at *e*, an L-shaped lever, K, which the driver from his seat can readily manipulate, the base *f* of which lever, when resting upon the tongue-plate, holds or suspends the main frame to the tongue or pole at its working or proper position for cutting. When, however, the lever K is drawn backward and downward, so that its toe portion, *e'*, rests upon the tongue-plate, then the main frame and cutting apparatus are raised up and suspended to the tongue or pole in that raised position. The lever, when the toe portion *e'* is thus brought against the tongue-plate, will remain and hold the main frame without any further fastening, the suspended weight being in or a little beyond its center of motion and thus locks it. The coupling-piece L, which unites the cutting apparatus to the main frame, is hinged to the main frame at the points *g*, so that the finger-bar M and the cutting apparatus *h* may be raised or lowered when necessary upon the main frame. To the coupling-piece—or that portion of it which may be termed the heel of the shoe, the shoe and coupling-piece being in one piece or fast to each other—there is pivoted, as at *i*, a link, N, which has an angular slot and seat, *j*, in it, from which extends a straight slot, *k*, to near its upper end, and through this slot *k* is passed a wrist-pin, *l*, which connects said link N with a crank-arm, O, that is turned upon a center, *m*, or support on the arm J, or a projecting portion thereof. To another part or projection of the arm J, which for another duty is wrought into ratchet-teeth or stops *n*, there is pivoted, as at *o*, a hand-lever, P, which is within easy reach and control of the driver in his seat; and upon the hub or lower end of the lever P, or rather its shoe or plate, there is a segment-gear, $p$, which takes into and works or turns another segment-gear, $q$, on the hub of the crank-arm, O, by which said crank-arm and the link N, the finger-bar, and cutting apparatus may be raised and held up, or let down, or adjusted, as will be explained hereafter. On the plate of the lever P there is a spring-bolt, $r$, which takes against the notches or stops $n$ and holds the cutting apparatus at said points; and, to release said bolt or draw it away from said stops or notches, the bolt is connected by a rod, $s$, to a thumb-lever, $t$, at or near the top of the main lever P. The knife $h$ is driven from the wrist-wheel $v$ through the pitman $u$, and a portion of the piece I is turned downward, as at $y$, to form a shield for the crank or wrist-wheel $v$. $w$, Fig. 2, is a clutch-lever, which has two cam-wings, $x$, that work against a pin (in dotted lines) to move the incased gears into or out of action, as may be desired. The adjustment made by means of the caster-wheel bar I, as above described, is permanent. There are, however, in addition to this permanent adjustment, three other adjustments, which can be used when necessary, two of them always within the control of the driver on his seat and the remaining one made by dismounting. By means of the lever K the forward part of the main frame and all its connected parts may be raised up on to or suspended to the tongue and carried by the tongue. While thus suspended and carried on the tongue the cutting apparatus can be raised or lowered on the main frame or held up by means of the lever P and spring-bolt $r$ and their co-operative parts; and by first hitching up the link N on to the wrist of the crank-arm O, by means of the slot or seat $j$, in which position the machine may be moved from place to place, and then using the levers K and P, the finger and cutter-bars and appliances may be raised up into a vertical position and so carried in transporting the machine.

The lever K may be removed when the machine is used on very uneven ground, and the lever P only used to raise, lower, and carry the cutting apparatus.

Having thus fully described our invention, what we claim therein as new, and desire to secure by Letters Patent, is—

1. In combination with a hinged finger-bar, and a lifting-lever for operating it, the intermediate crank-arm and the link, with its angular slot or seat for hitching over the wrist-pin of the crank-arm, and so holding and carrying the finger-bar, substantially as described.

2. We also claim, in combination with a main frame and a tongue-plate, both independently hinged, the arm J, the ears 5, and the lever K, pivoted to the arm J, so that the main frame can be raised and carried by the tongue, substantially as described.

3. We also claim the arm or post J projecting from the main frame and forming a support for the levers, by which the cutting apparatus is raised, lowered, and carried.

ORRIN H. BURDICK.
OSCAR F. DAGGETT.

Witnesses:
W. D. BALDWIN,
F. WRIGHT.